United States Patent [19]

Ferguson

[11] 3,942,116
[45] Mar. 2, 1976

[54] TRANSCEIVER HAVING IMPROVED VOICE ACTUATED CARRIER AND ECHO SUPPRESSION CIRCUIT

[75] Inventor: Myron E. Ferguson, Cupertino, Calif.

[73] Assignee: California Microwave, Inc., Sunnyvale, Calif.

[22] Filed: Mar. 13, 1975

[21] Appl. No.: 558,170

[52] U.S. Cl. ............................. 325/22; 179/170.6
[51] Int. Cl.² .......................................... H04B 1/44
[58] Field of Search .......... 179/1 SW, 1 VC, 170.2, 179/170.6, 170.8; 325/21, 22, 52, 144–152; 343/175, 180

[56] References Cited
UNITED STATES PATENTS

| | | | |
|---|---|---|---|
| 1,691,076 | 11/1928 | Mathes | 325/22 |
| 2,820,108 | 1/1958 | Kass | 179/170.2 |
| 3,145,269 | 8/1964 | Gardner et al. | 179/170.6 |
| 3,283,074 | 11/1966 | Csicsatka | 179/1 SW |
| 3,351,720 | 11/1967 | Brady | 179/170.6 |
| 3,397,401 | 8/1968 | Winterbottom | 325/22 X |
| 3,560,669 | 2/1971 | Foulkes et al. | 179/170.6 |

Primary Examiner—Benedict V. Safourek
Attorney, Agent, or Firm—Schatzel & Hamrick

[57] ABSTRACT

A transceiver comprising a transmit circuit for receiving a transmit audio frequency signal from a voice input transducer and including a delay line for delaying the transmit audio frequency signal, a modulator for converting the delayed transmit audio frequency signal to a transmitable radio frequency signal and a first switchable attenuator responsive to a control signal and operative to selectively couple the radio frequency signal to an output terminal for transmission; a receive circuit for receiving a responsive radio frequency transmission and including a demodulator for converting the received radio frequency signal to a received audio frequency signal, and a second switchable attenuator responsive to the control signal and operative to selectively couple the received audio frequency signal to a voice output transducer; and a control circuit including a transmit detector for detecting the transmit audio frequency signal level, a receive detector for detecting the received audio frequency signal level, and a comparator for comparing the outputs of the transmit detector and receive detector and developing the control signal.

12 Claims, 3 Drawing Figures

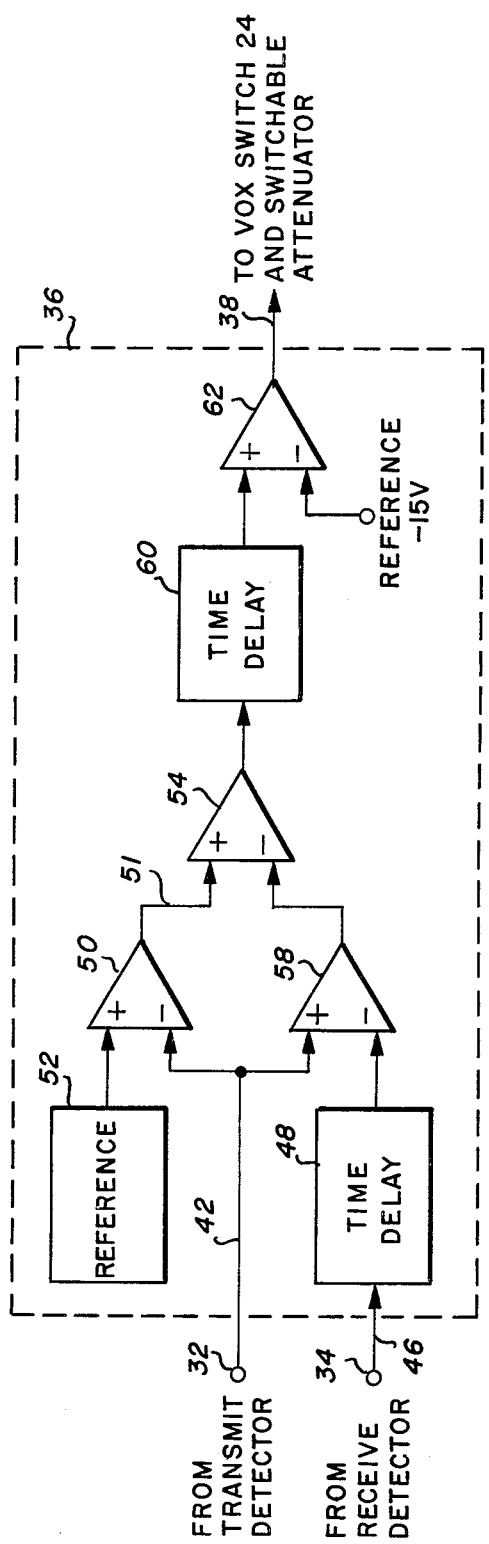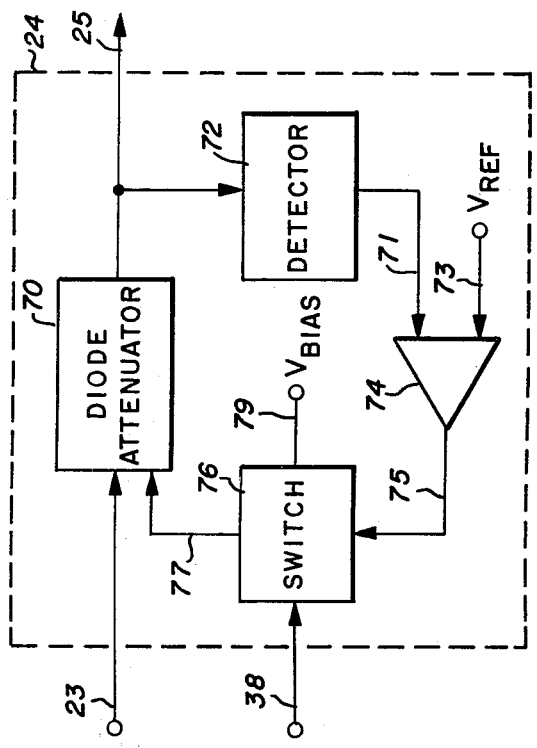

TRANSCEIVER HAVING IMPROVED VOICE ACTUATED CARRIER AND ECHO SUPPRESSION CIRCUIT

BACKGROUND OF THE INVENTION

1. Field of the Invention

The present invention relates generally to communications apparatus and more particularly to a radio frequency transceiver having an improved voice actuated carrier and echo suppression circuit particularly suited for use in earth station-to-satellite communication systems and the like.

2. Description of the Prior Art

Among the myriad problems encountered in designing communication systems such as are used in linking earth stations via satellites are those relating to transmitter power drain and echos generated in the transmission loop. In dealing with the first of these problems, transmitters have been developed having voice actuated carrier controls wherein the transmission of a carrier signal is inhibited in the absence of a voice or data input to the transmitter. This obviously reduces the transmission power required from the transmitter during the communication sequence. Such apparatus typically utilizes a fast operating detector for detecting an input signal and a fast operating switching means responsive to the detector for instantaneously actuating the transmitter. However, accompanying such solution is the disadvantage that there is always some first syllable clipping and there is typically some signal degeneration during the transition period required for the transmitter to settle down after having been actuated.

Echo in a telecommunication system typically originates at the far end of a communications circuit where there is frequently an impedance mismatch that results in a reflection of received energy back into the transmit path. As a result, while talking, a talker hears his own speech with a delay proportionate to the transmission circuit link. Such reflection can normally be made tolerable by providing fixed circuit loss in the return path appropriate to the amount of round trip delay. However, when the delay is greater than about 40 milliseconds, the impairment due to the echo becomes intolerable.

Echo suppression circuits having long time delays, such as those used in satellite communication systems, are normally located at both ends of the communications link with each operating independently to react to local transmit and receive levels. Such circuits usually include in the transmit path a unity gain amplifier and a suppression switch which, when activated (during receive mode operation), provides more than 50dB of loss. The control circuitry for the transmit function includes a break-in sensitivity adjustment, a transmit detector and a comparator. In the receive path, an amplifier is provided having the capability of being automatically switched from unity gain to about 6dB of loss. The receive circuit, like the transmit circuit, has a sensitivity adjustment and also includes a receive detector and hysteresis control.

Pursuant to CCITT standards, the suppression circuitry is activated (a loss is inserted in the transmit path) when the receive level is above −31dBmO and is greater than the transmit level. The suppression switch is inhibited (no loss is inserted) when one of two conditions is met; either the receive level is less than −31dBmO or the transmit level is greater than the receive level. When the transmit level is greater than the receive level the receive path is also conditioned for 6dB loss. The comparator is normally also equipped with a break-in hangover feature which reduces transmit speech clipping. This hangover delay maintains the bi-directional condition during transmit level pauses of less than 200 to 300 milliseconds to prevent loss of syllables due to unnecessary switching. Loss of speech at the beginning of a train of conversation (speech clipping) is usually further reduced by the use of a short time constant in the detection circuitry.

Among the disadvantages of the prior art devices are that almost all suffer from at least some first syllable clipping of the transmission and almost all experience signal degeneration due to the turning on of the carrier during the transmission of the first syllable and due to the use of duplicated components in the separate echo suppression and voice actuated carrier circuits.

SUMMARY OF THE PRESENT INVENTION

It is therefore a principal objective of the present invention to provide an improved transceiver having a single operative circuit which simultaneously accomplishes both echo suppression and voice actuated carrier control.

Another objective of the present invention is to provide a transceiver of the type described having circuitry which eliminates the need for a suppression switch in the audio portion of the transmit circuit and further eliminates the need for a separate voice detector in the voice actuated carrier control.

Briefly, the present invention comprises a transceiver including an rf modulator, an rf demodulator, a signal delay element coupled between the voice signal input terminal and the modulator, a carrier control switch coupled between the modulator output and the transmission output terminal, a transmit detector coupled to the transmit voice signal input terminal, a receive detector connected to the received voice signal output terminal, and a comparator for comparing the outputs of the two detectors and for generating a control signal for controlling the carrier switch. The comparator output also controls a switchable attenuator disposed in the receive circuit between the demodulator and the received voice signal output terminal.

One of the advantages of the present invention is that it accomplishes the same function accomplished in prior art systems but requires fewer operative components.

Another advantage of the present invention is that, since a delay line is interposed between the detection and control portions of the circuit, no initial syllable clipping occurs.

Still another advantage of the present invention is that both the echo suppression feature and the voice actuated carrier control feature are combined in a single circuit, with the result being that high signal integrity is preserved.

Other objects and advantages of the present invention will no doubt become apparent to those of ordinary skill in the art after having read the following detailed disclosure of the preferred embodiment illustrated in the several figures of the drawing.

IN THE DRAWING

FIG. 2 is a block diagram showing components of the comparator illustrated in FIG. 1 of the drawing; and FIG. 3 is a block diagram showing components of the carrier control switch illustrated in FIG. 1 of the drawing.

DETAILED DESCRIPTION OF THE PREFERRED EMBODIMENTS

Figure 1:
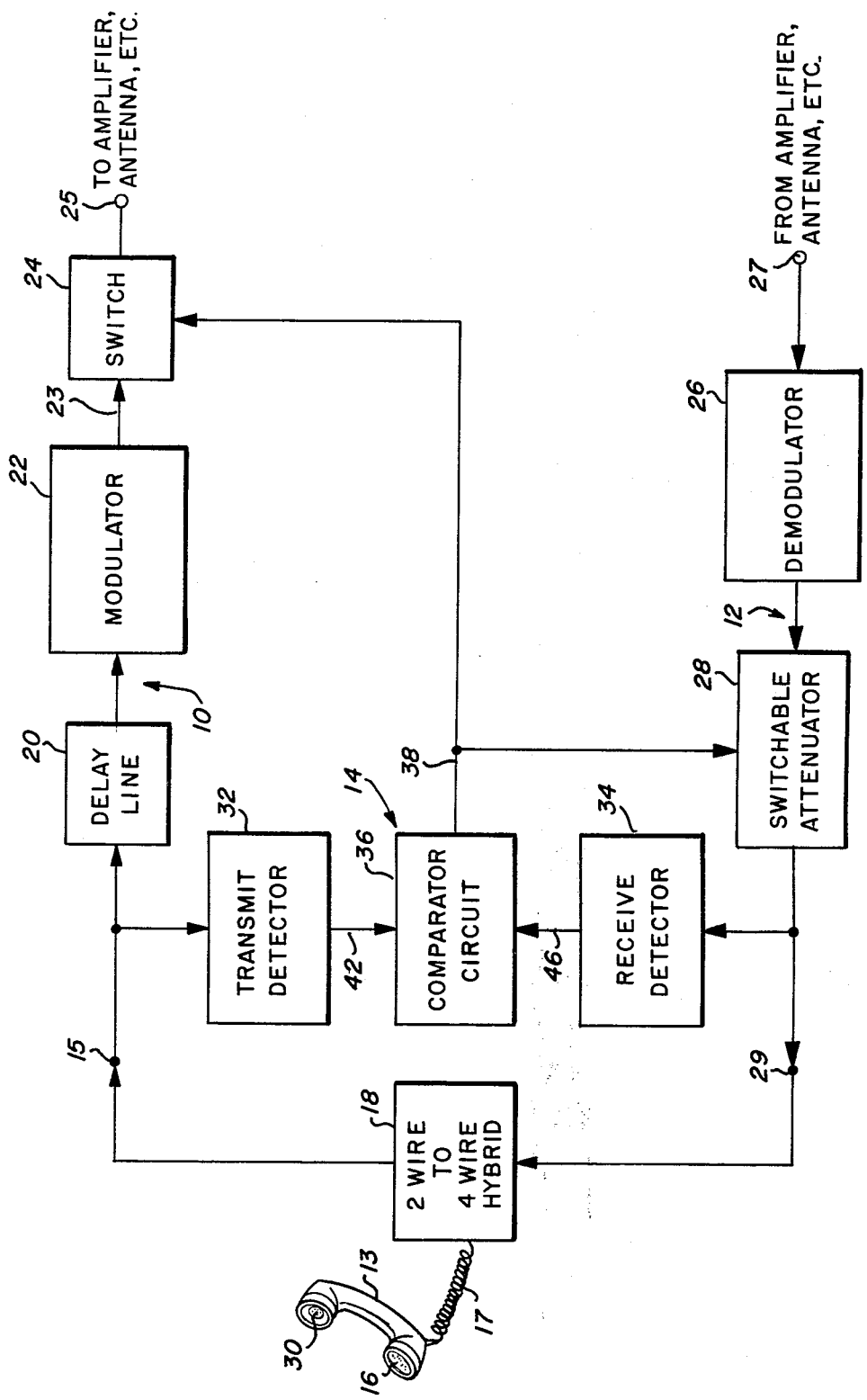
FIG. 1 is a block diagram of a transceiver having a voice actuated carrier and echo suppression circuit in accordance with the present invention.

Referring now to FIG. 1 of the drawing there is shown a generalized block diagram of a single channel transceiver including a transmit circuit referred to generally by the numeral 10, a receive circuit referred to generally by the numeral 12, and a control circuit referred to generally by the numeral 14. Transmit circuit 10 includes a transmit voice signal input terminal 15 for receiving an audio frequency signal from an electromechanical voice input transducer, such as the telephone mouthpiece 16 coupled through one branch of a two-wire to four-wire hybrid 18, a delay line 20, a modulator 22, a carrier control switch 24, and a transmitter output terminal 25. It should be noted, however, that the line schematically illustrated at 17 could consist of thousands of miles of transmission line, amplifying and switching equipment, etc., used to connect the telephone set 13 and the hybrid 18.

Receive circuit 12 includes a demodulator 26, a receiver input terminal 27, a switchable attenuator 28, and a received voice signal output terminal 29 coupled through the other branch of hybrid 18 to a suitable electromechanical voice output transducer such as the telephone earpiece 30. The control circuit 14 includes a transmit detector 32 having its input coupled to input terminal 15, a receive detector 34 having its input coupled to output terminal 29, and a comparator circuit 36 having one of its inputs coupled to the output of transmit detector 32 and another of its inputs coupled to the output of receive detector 34. The output of comparator 36 is coupled to switch 24 and to attenuator 28 via the lines 38.

Delay line 20 may take the form of any suitable device capable of delaying an input audio frequency signal for a period of approximately 7 milliseconds with minimal distortion of the signal. In the preferred embodiment delay line 20 is of the bucket brigade type.

Modulator 22 includes those components required to perform the normal modulation functions accomplished in standard rf communications transmitters. For example, it may include such components as a compressor, an emphasis circuit, a peak limiting circuit, an FM modulating circuit, a mixer, a local oscillator, etc. Switch 24 is a carrier switching device capable of responding to an electrical control signal to inhibit the transmission of the carrier signal or otherwise interrupt the transmission path between the modulator 22 and the transmitter output terminal 25. Switch 24 may also include level control circuitry for controlling the carrier signal level.

Demodulator 26 is likewise comprised of ordinary rf demodulator components capable of converting received rf signals into audio frequency signals. The audio frequency output of demodulator 26 is coupled to the earpiece 30 through attenuator 28, the hybrid 18 and such other voice transmission equipment as may be present in the circuit.

In the preferred embodiment, attenuator 26 is a 6dB pad but may take the form of any attenuating mechanism capable of being switched on (approximately 6dB attenuation) and off (substantially 0dB attenuation) by the control signal generated by comparator circuit 36. In the preferred embodiment the modulator and demodulator components operate in the 52 to 97 mHz frequency band but could just as well operate in any other radio frequency band.

Detector 32 monitors the signal level at terminal 15 and generates a DC signal on line 42 which is proportional to the amplitude of the audio frequency voice signal input thereto. Likewise, receive detector 34 monitors the signal level at terminal 29 and develops a DC signal on line 46 which is proportional to the amplitude of audio frequency received voice signals output therefrom.

Comparator circuit 36 responds to the signals developed on lines 42 and 46, and generates a control signal having one value when the detected transmit voice signal level is either less than −31dBmO (or other preset reference level) or is less than the detected received voice signal level; the control signal has another value when the detected transmit level is greater than the detected received level. Although −31dBmO is the CCITT operate level and this level is normally used in the preferred embodiment, the detectors are adjustable over a range of levels. As will be explained further below, the comparator circuit 36 also includes certain timing features to accommodate pauses and to expedite break-in.

In operation, with the transceiver properly biased for operation and with no audio input to transducer 16, the audio frequency signal level input to terminal 15 will be less than −31dBmO and comparator circuit 36 will develop a control signal on line 38 which causes switch 24 to inhibit the transmission of the carrier from modulator 22, and which causes switchable attenuator 28 to introduce no attenuation into the receiver circuit. Likewise, an rf signal received by demodulator 26 will be converted into a received audio frequency signal and will be passed through attenuator 28 and hybrid 18 to transducer 30 to produce a voice output. If at any time, either before, during or after a received signal appears at terminal 29, a voice input having a signal level equal to or greater than the receive level is detected by transmit detector 32, comparator circuit 36 will be caused to develop a control signal on line 38 which "breaks in" on the receive operation by switching attenuator 28 to a 6dB attenuation mode, and which closes switch 24 allowing the carrier generated by modulator 22 to reach the output terminal 25 for transmission.

During the time this detection and switching operation is taking place, the input voice signal propagates through the delay line 20 and eventually reaches modulator 22 approximately 7 milliseconds after it was detected at terminal 15. Since the time required for transmit detector 32 to detect an input voice signal and cause comparator 36 to generate a control signal on line 38 is less than 4 milliseconds, it will be appreciated that the delay afforded by delay line 20 will effectively permit switch 24 to turn on the modulator 22 and allow the carrier to settle down before the voice signal is modulated onto the carrier for transmission. The use of this same control signal to actuate attenuator 28 prevents any returning echos from reaching hybrid 18 with sufficient signal level to interfere with the transmission.

Referring now to FIG. 2 of the drawing, a more detailed block diagram showing the components of comparator circuit 36 is illustrated. In this embodiment, comparator circuit 36 is comprised of a first signal comparator 50 having its noninverting input connected to a source 52 of reference potential, and its inverting input connected to line 42, the output of transmit detector 32. The output of the comparator 50 is connected to the noninverting input of a second signal comparator 54. A third signal comparator 58 has its noninverting input connected to the output of transmit detector 32 and its inverting input connected to the output of receive detector 34 through timing circuit 48. The output of comparator 58 is connected to the inverting input of comparator 54. The output of comparator 54 is connected to the noninverting input of a fourth comparator 62 through a timing circuit 60. The inverting input of comparator 62 is connected to a reference potential of −15 volts.

In the preferred embodiment, reference source 52 generates a reference potential equivalent to a signal developed by detector 32 when the magnitude of the voice signal detected thereby is −31dBmO. Comparator 50 develops a −20 volt output on line 51 when the input audio frequency signal level (transmit voice level) is less than −31dBmO, and generates a −7 volt potential on line 51 when the transmit voice level is greater than −32dBmO.

Comparator 58 develops a 0 volt output when the transmit voice level is less than the receive voice level, and generates a −13 volt output when the transmit voice level is equal to or greater than the receive voice level.

The timing circuits 48 and 60 may be comprised of either active or passive devices having nonreciprocal time constants. Timing circuit 48 has a rise time of less than 1 ms and a fall time of approximately 40 ms and serves to suppress near end echos of up to 40 ms. Timing circuit 60 has a rise time of less than 1 ms and a fall time greater than 200 ms. The purpose of timing circuit 60 is to allow speaker pauses of up to 200 ms without interrupting the transmission. Although the leading edge of a pulse passing through timing circuit 60 is not substantially affected by the delay, the transition characteristic of the trailing edge is of an exponentially decaying nature. In order to square up the trailing edge, the comparator 62 is utilized as a Schmitt trigger, the output of which changes state between 0 volts and −20 volts each time the signal applied to its noninverting input passes through −15 volts.

Accordingly, in response to the particular inputs applied thereto, comparators 54 and 62 develop −20 volt outputs when the transmit voice level is less than −31dBmO; −20 volt outputs when the transmit voice level is less than the receive voice level; and 0 volt outputs when the transmit voice level is greater than the receive voice level. Differences in the time at which these output signals are generated by comparator 54 and 62 are controlled by timing circuit 60 as mentioned above. The 0 volt or −20 volt output developed on line 38 serves as the control signal for actuating switch 24.

For the system to operate in the intended manner it is apparent that the switch 24 must respond to a 0 volt control signal (on line 38) by turning "on" the carrier, and must respond to a −20 volt control signal by turning "off" the carrier. Similarly, attenuator 28 must respond to the 0 volt control signal by introducing a 6dB loss into the receive circuit, and must respond to the −20 volt control signal by introducing no loss into the receive circuit.

In FIG. 3 a block diagram of one embodiment of switch 24 is illustrated which includes a diode attenuator 70, a detector 72, an error amplifier 74 and a switch 76. Attenuator 70 is connected in series between the output lead 23 of modulator 22 and the output terminal 25. Detector 72 has its input connected to the output terminal 25 and its output connected to error amplifier 74. Error amplifier 74 has one input 71 connected to the output of detector 72, and a second input 73 connected to a reference source $V_{REF}$. The output voltage developed on line 75 is the amplified difference between the two inputs. It has zero output when the two inputs are equal. The output of error amplifier 74 is connected to the control input of diode attenuator 70 through switch 76.

Switch 76 in the illustrated embodiment is a solid state device, but alternatively may be an electromechanical switching means for switching the control input 77 between the error amplifier output 75 and a bias voltage applied at 79. When output 38 of comparator 36 is 0 volts, switch 76 connects output 75 of error amplifier 74 to the control input 77 of attenuator 70. When output 38 of comparator 36 is −20 volts, switch 76 connects control input 77 to a bias voltage selected to cause maximum attenuation in attenuator 70.

With a −20 volt control signal applied to switch 76 at terminal 38, diode attenuator 70 will be caused to introduce a minimum of 50 dB attenuation into the circuit between the modulator output 23 and the output terminal 25, thus effectively blocking the transmission of carrier energy. On the other hand, when comparator circuit 36 causes a 0 volt control signal to appear on line 38, attenuator 70 will introduce a controlled attenuation into the circuit thus allowing the carrier to pass through to output terminal 25. The feedback loop including detector 72 and amplifier 74 will monitor the carrier signal level at output 25 and will control attenuator 70 in such a manner as to maintain the output signal level at terminal 25 at a predetermined value.

Although the present invention has been described above in terms of a single preferred embodiment, it will be appreciated that various alterations and modifications thereof will become apparent to those skilled in the art after having read the preceding disclosure. Accordingly, it is intended that the following claims be interpreted as including all such alterations and modifications as fall within the true spirit and scope of the invention.

What is claimed is:

1. A transceiver for use with a means for converting a voice input to an audio frequency transmit voice signal and for converting a received voice signal to a voice output, comprising:
   a transmit circuit including,
      signal delay means for delaying the transmit voice signal for a predetermined period of time, signal modulating means for converting the delayed transmit voice signal to a corresponding radio frequency signal, and
      first means responsive to a control signal and operative to selectively cause said radio frequency signal to be transmitted;
   a receive circuit including,
      signal demodulating means for converting the received radio frequency signal to an audio frequency received voice signal,
      second means responsive to said control signal and operative to selectively attenuate said received voice signal; and
   a control circuit including, first detector means responsive to said transmit voice signal and operative to develop a first detected signal, second detector means responsive to said received voice signal and operative to develop a second detected signal, and signal comparing means responsive to said first and second detected signals and operative to generate said control signal when said first and second detected signals have a predetermined relationship.

2. A transceiver as recited in claim 1 wherein said signal comparing means includes, a first comparator for comparing said first detected signal to a first reference signal, and for developing a first comparison signal when said first detected signal is less than said first reference signal, and for developing a second comparison signal when said first detected signal is greater than said first reference signal, a second comparator for comparing said first detected signal to said second detected signal, and for developing a third comparison signal when said first detected signal is less than said second detected signal, and for developing a fourth comparison signal when said first detected signal is greater than said second detected signal, and a third comparator for comparing one of said first and second comparison signals to one of said third and fourth comparison signals and for generating a fifth comparison signal.

3. A transceiver as recited in claim 2 wherein said signal comparing means further includes, a second signal delay means for time delaying said fifth comparison signal, and a fourth comparator for comparing the delayed fifth comparison signal to a second reference signal to develop said control signal.

4. A transceiver as recited in claim 2 wherein said signal comparing means includes a second signal delay means for time delaying said second detected signal before it is input to said second comparator.

5. A transceiver as recited in claim 1 wherein said first means includes a variable attenuator serially connected in the output circuit of said signal modulating means, said attenuator being variable in response to said control signal.

6. A transceiver as recited in claim 5 wherein said first means further includes a signal level control circuit responsive to the signal level appearing at said output terminal and operative in a predetermined manner to vary said attenuator.

7. A transceiver having an improved voice actuated carrier and echo suppression circuit comprising:

a transmitter input terminal for receiving a transmit voice signal;

a transmitter output terminal;

signal delay means, signal modulating means and switching means serially connected between said transmitter input terminal and said transmitter output terminal, said switching means being responsive to a control signal and operative to selectively couple the output of said signal modulating means to said transmitter output terminal;

a receiver input terminal for receiving modulated signals;

a receiver output terminal;

signal demodulating means connected between said receiver input terminal and said receiver output terminal and operative to convert a modulated signal received at said receiver input terminal and to develop a receiver voice signal at said receiver output terminal;

a first detector responsive to a transmit voice signal input to said transmitter input terminal and operative to develop a first detected signal;

a second detector responsive to a received voice signal appearing at said receiver output terminal and operative to develop a second detected signal; and signal comparing means responsive to said first and second detected signals and operative to generate said control signal when said first and second detected signals have a predetermined relationship.

8. A transceiver as recited in claim 7 and further including signal attenuating means coupling the output of said signal demodulating means to said receiver output terminal, said attenuating means being responsive to said control signal and operative to switch between two values of attenuation.

9. A transceiver as recited in claim 7 wherein said signal comparing means includes a first comparator for comparing said first detected signal to a reference signal, and for developing a first comparison signal when said first detected signal is less than said reference signal, and for developing a second comparison signal when said first detected signal is greater than said reference signal, a second comparator for comparing said first detected signal to said second detected signal, and for developing a third comparison signal when said first detected signal is less than said second detected signal, and for developing a fourth comparison signal when said first detected signal is greater than said second detected signal, and a third comparator for comparing one of said first and second comparison signals to one of said third and fourth comparison signals and for generating a fifth comparison signal.

10. A transceiver as recited in claim 9 wherein said signal comparing means further includes a second signal delay means for time delaying said second detected signal before it is input to said second comparator.

11. A transceiver as recited in claim 10 wherein said signal comparing means further includes a third signal delay means for time delaying said fifth comparison signal, and a fourth comparator for comparing the delayed fifth comparison signal to a second reference signal to develop said control signal.

12. A transceiver as recited in claim 7 wherein said switching means includes a variable attenuator serially connected between the output of said signal modulating means and said transmitter output terminal, said attenuator being variable in response to said control signal.

* * * * *